United States Patent
Logan et al.

(10) Patent No.: US 8,406,817 B2
(45) Date of Patent: Mar. 26, 2013

(54) MOBILE WIRELESS COMMUNICATIONS DEVICE WITH FIRST AND SECOND ALARM FUNCTION GUI'S AND RELATED METHODS

(75) Inventors: Adrian Michael Logan, Milton (CA); Rohit Rocky Jain, Waterloo (CA); Steve Kin Ping Chung, Waterloo (CA)

(73) Assignee: Research In Motion Ltd, Waterloo, Ontario (CA)

( * ) Notice: Subject to any disclaimer, the term of this patent is extended or adjusted under 35 U.S.C. 154(b) by 0 days.

(21) Appl. No.: 13/191,858

(22) Filed: Jul. 27, 2011
(Under 37 CFR 1.47)

(65) Prior Publication Data
US 2013/0029729 A1    Jan. 31, 2013

(51) Int. Cl.
*H04B 1/38* (2006.01)
(52) U.S. Cl. ... 455/566; 455/90.1; 455/90.3; 455/556.1; 455/557; 368/263; 368/243; 368/244; 368/261
(58) Field of Classification Search .................. 455/566, 455/90.1, 90.3, 556.1, 557; 368/263, 244, 368/243, 261, 72, 250
See application file for complete search history.

(56) References Cited

U.S. PATENT DOCUMENTS

| | | | | |
|---|---|---|---|---|
| 2003/0025592 A1* | 2/2003 | Choi et al. | | 340/309.15 |
| 2004/0142720 A1* | 7/2004 | Smethers | | 455/550.1 |
| 2008/0150959 A1 | 6/2008 | Marui | | 345/594 |
| 2010/0304722 A1* | 12/2010 | Tanaka | | 455/414.1 |
| 2011/0074558 A1 | 3/2011 | Hiroaki | | |

OTHER PUBLICATIONS

"Gentle Alarm—Android app on AppBrain," Dec. 1, 2010, 2 pages.
European Search Report, EP12152465.6, Nov. 14, 2012.

\* cited by examiner

*Primary Examiner* — Tuan Pham

(57) ABSTRACT

A mobile wireless communications device may include a portable housing, a wireless transceiver carried by the portable housing, an input device carried by the portable housing, a display carried by the portable housing, and a processor carried by the portable housing and coupled to the wireless transceiver, the input device, and the display. The processor may perform a time alarm function having a time alarm value settable via the input device, and generate an alarm indication upon reaching the time alarm value. The processor also may generate a first time alarm function GUI on the display including a first selectable menu list for the time alarm function, and generate a second time alarm function GUI including a second selectable menu list on the display different from the first selectable menu list when a current time is within a threshold time of the time alarm value.

21 Claims, 5 Drawing Sheets

MOBILE WIRELESS COMMUNICATIONS DEVICE WITH FIRST AND SECOND ALARM FUNCTION GUI'S AND RELATED METHODS

TECHNICAL FIELD

This application relates to the field of communications, and more particularly, to wireless communications systems and related methods.

BACKGROUND

Mobile communications devices have become an integral part of society over the last two decades. Indeed, more than eighty-two percent of Americans own a mobile communications device, for example, a cell phone device. Even further, international cell phone device penetration has reached 3.3 billion units. In other words, approximately half the world's population has a cell phone device. The typical cell phone device includes an antenna, and a transceiver coupled to the antenna. The transceiver and the antenna cooperate to transmit and receive communications signals with a network infrastructure, usually maintained by a cell phone provider. Although the first cell phone devices typically included only voice or limited short message service capabilities, the capabilities of cell phone devices have increased greatly over the last decade.

More so, the typical "smart phone," i.e. a cell phone device with advanced capabilities, rivals the processing power and memory of desktop personal computers of a decade earlier. For example, the typical smart phone is capable of running a variety of advanced programs spanning from typical word processing software to global positioning system navigation software. One particularly desirable and popular cell phone device program is the time alarm program. Quite simply, the time alarm program provides many of the same features available from a typical stand-alone alarm clock, such as, multiple alarms and a snooze feature, etc.

Nevertheless, the time alarm program may suffer from some drawbacks, several being the same drawbacks found in stand-alone alarm clocks. For example, if the user awakens before the set alarm time, the user typically must disable the time alarm program to prevent an unnecessary and annoying alarm. Of course, if the time alarm program operates in typically periodic fashion, such as, daily, the user must remember to re-enable the time alarm program after the set alarm time.

DETAILED DESCRIPTION OF THE PREFERRED EMBODIMENTS

Figure 1:
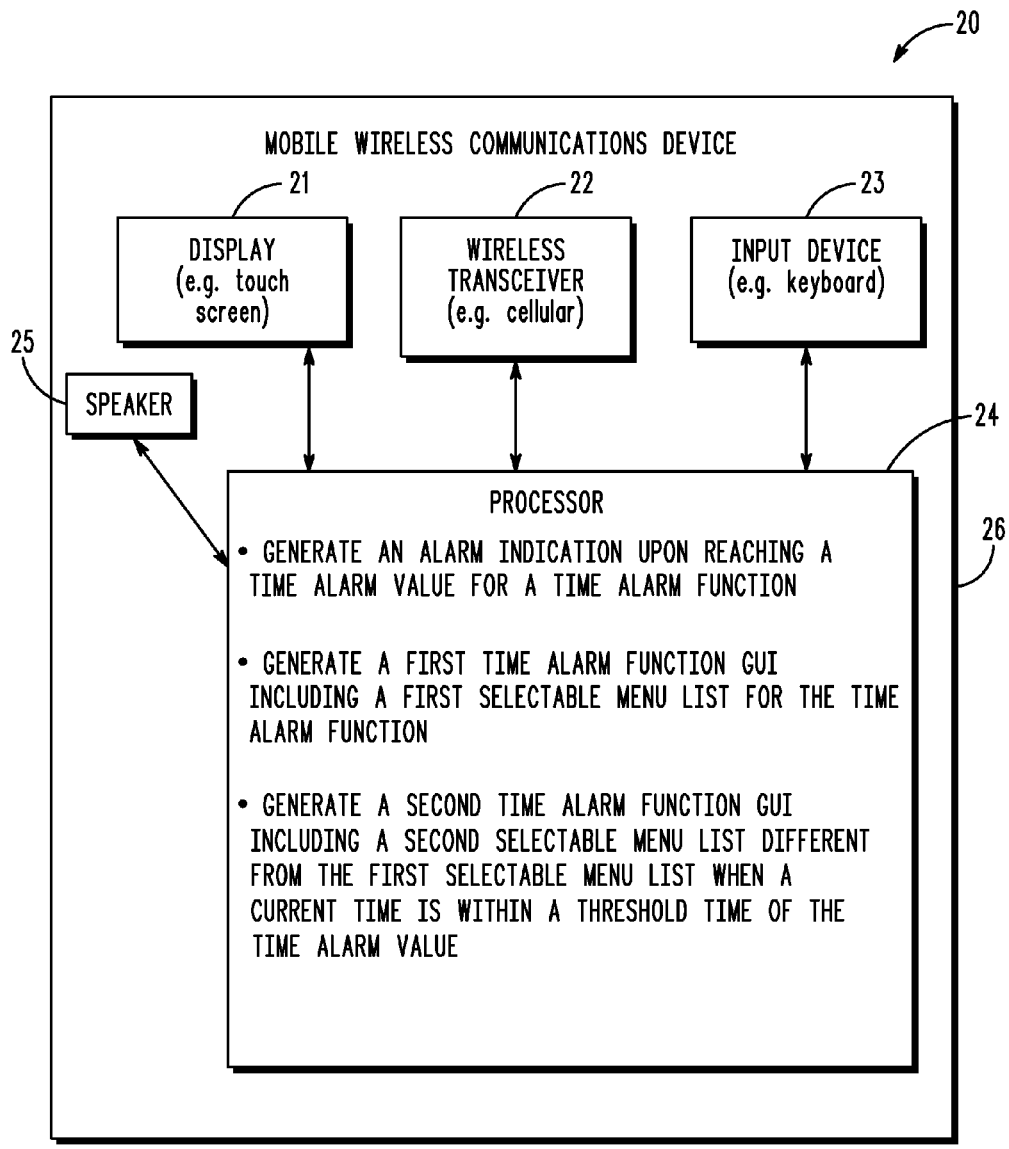
FIG. 1 is a schematic block diagram of an example embodiment of a mobile wireless communications device.

The present description is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout.

An example aspect is directed to a mobile wireless communications device that may include a portable housing, a wireless transceiver carried by the portable housing, an input device carried by the portable housing, a display carried by the portable housing, and a processor carried by the portable housing and coupled to the wireless transceiver, the input device, and the display. The processor may be configured to perform a time alarm function having a time alarm value settable via the input device, generate an alarm indication upon reaching the time alarm value, generate a first time alarm function graphical user interface (GUI) on the display including a first selectable menu list for the time alarm function, and generate a second time alarm function GUI including a second selectable menu list on the display different from the first selectable menu list when a current time is within a threshold time of the time alarm value.

More specifically, the processor may be configured to generate the second selectable menu list comprising a menu option for skipping a next alarm indication. For example, the processor may be configured to generate the first selectable menu list comprising a menu option for changing the time alarm value. Also, the processor may be configured to generate the first selectable menu list comprising a menu option for disabling the time alarm function. Additionally, the processor may be configured to generate the first selectable menu list comprising a menu option for changing an alarm operation mode. Moreover, the processor may be configured to generate the first selectable menu list comprising a menu option for a utility sub-menu.

In some embodiments, the mobile wireless communications device may further comprise a speaker carried by the housing and coupled to the processor, and the processor may be configured to generate the alarm indication on the speaker. The processor may be configured to permit the setting of the threshold time via the input device. The input device may comprise a touch portion of the display, for example.

Another example aspect is directed to a method of operating a time alarm function with a settable time alarm value for a mobile wireless communications device. The method may comprise generating a first time alarm function GUI on a display of the mobile wireless communications device and including a first selectable menu list for the time alarm function if a current time is outside a threshold time of the time alarm value, and generating a second time alarm function GUI including a second selectable menu list on the display different from the first selectable menu list when the current time is within the threshold time of the time alarm value.

Example mobile wireless communications devices may include portable or personal media players (e.g., music or MP3 players, video players, etc.), remote controls (e.g., television or stereo remotes, etc.), portable gaming devices, portable or mobile telephones, smartphones, tablet computers, etc.

Figure 4:
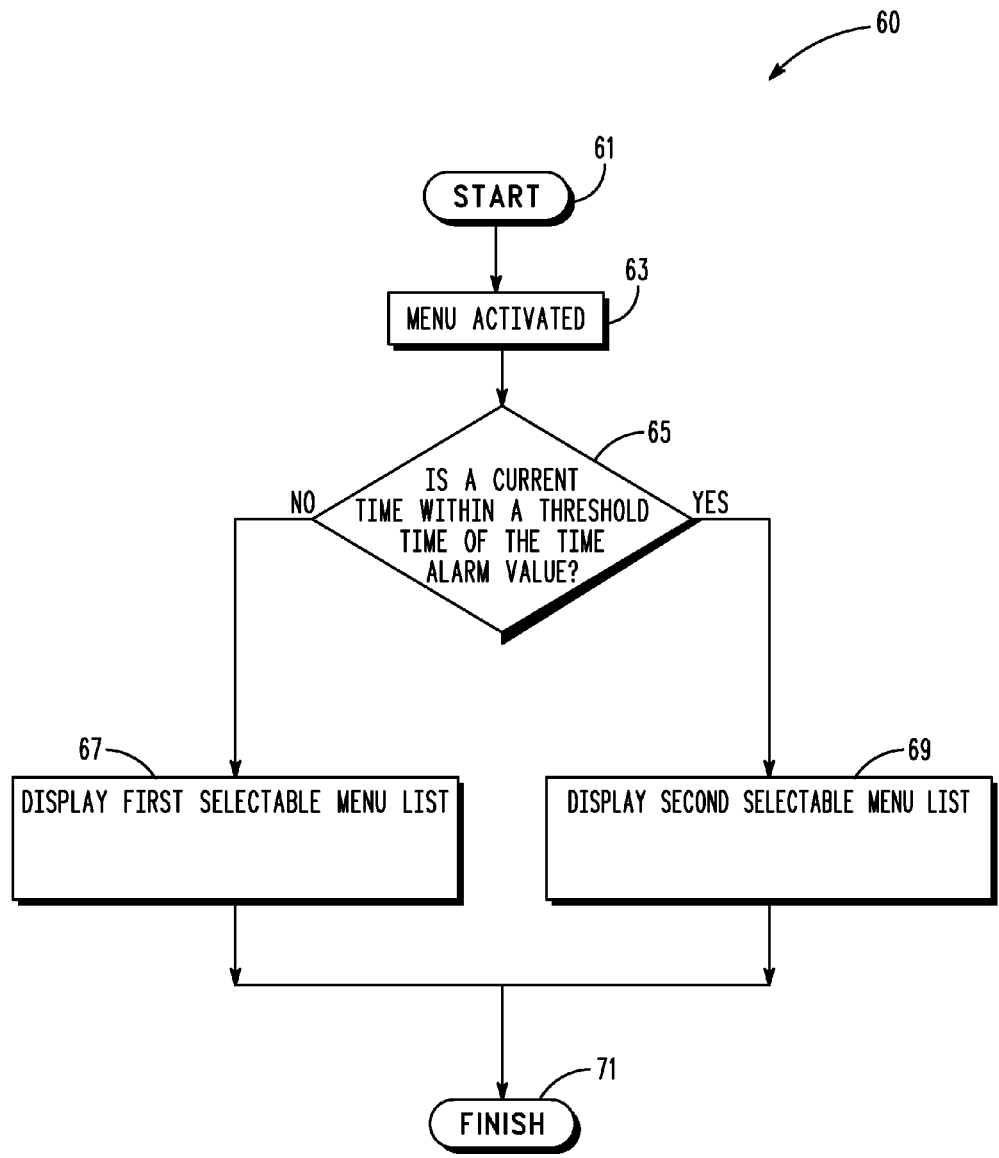
FIG. 4 is a flowchart illustrating operation of the mobile wireless communications device of FIG. 1.

Referring now to FIG. 1, a mobile wireless communications device 20 according to the present disclosure is now described. Moreover, with reference additionally to FIG. 4, a flowchart 60 illustrates a method of operating the mobile wireless communications device 20 (Block 61). The mobile wireless communications device 20 illustratively includes a portable housing 26, a wireless transceiver 22 carried by the portable housing, and an input device 23 carried by the portable housing. As will be appreciated by those skilled in the art, the wireless transceiver 22 may comprise, for example, a cellular transceiver, such as any one of the cellular standard transceivers discussed herein. The input device 23 may comprise a keyboard, or a touch screen, for example.

The mobile wireless communications device 20 illustratively includes a display 21 carried by the portable housing 26, and a processor 24 carried by the portable housing and coupled to the wireless transceiver 22, the input device 23, and the display. The processor 24 is illustratively configured to perform a time alarm function having a time alarm value settable via the input device 23. As will be appreciated by those skilled in the art, the time alarm function operates to generate an alarm indication upon a current time value, typically provided by onboard systems or the wireless network, reaching the time alarm value. For example, in the illustrated embodiment, the mobile wireless communications device 20 illustratively includes a speaker 25 for cooperating with the processor 24 to produce an audio alarm indication, such as a buzzer or tone.

Figure 2:
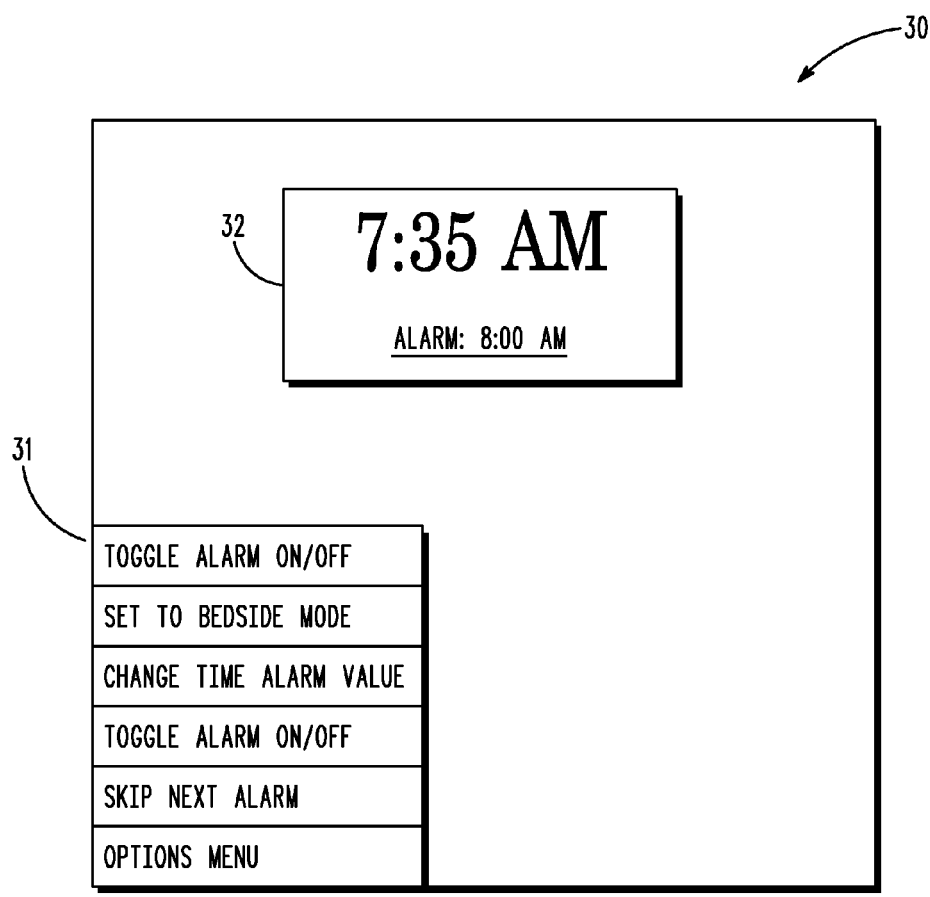
FIGS. 2-3 are screenshots from the mobile wireless communications device of FIG. 1.
Figure 3:
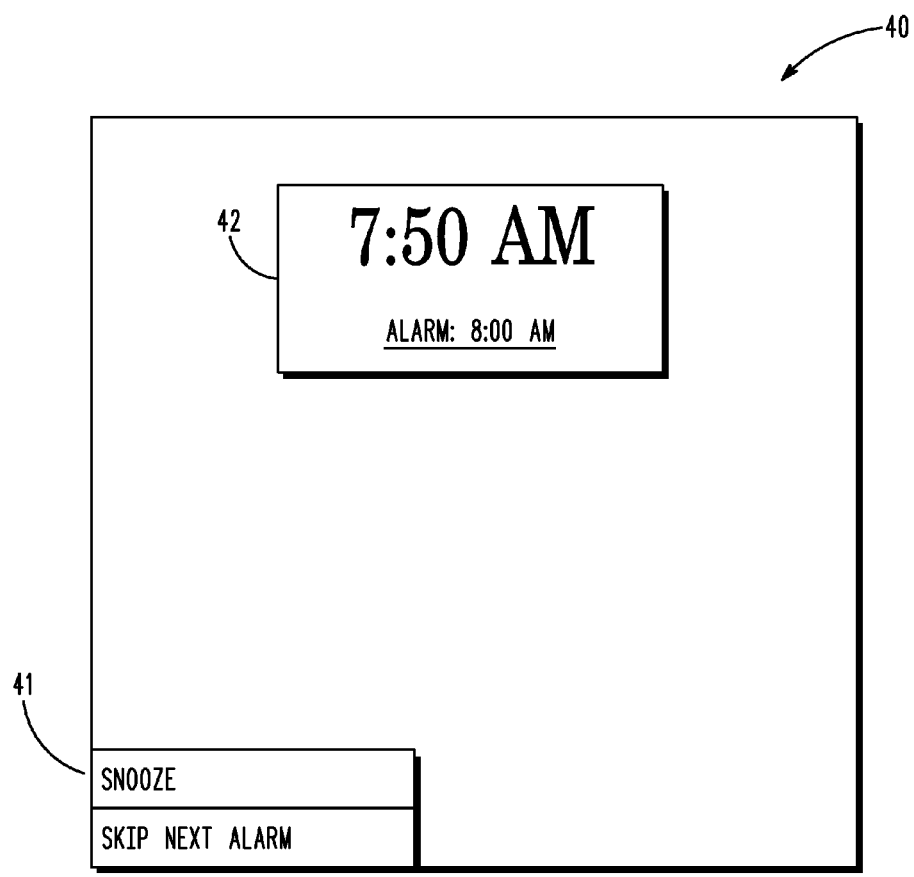

Referring now additionally to FIGS. 2-3, when the user of the mobile wireless communications device 20 accesses the time alarm function, the processor 24 presents a default GUI to the user on the display 21 (Block 63). During normal operation, when the time alarm function is accessed, the processor 24 illustratively generates a first time alarm function GUI 30 on the display including a first selectable menu list 31 for the time alarm function (Blocks 65, 67). The first time alarm function GUI 30 includes a time display 32 including the current time value, and the time alarm value. The first selectable menu list 31 illustratively includes a menu option for disabling the time alarm function, a menu option for changing an alarm operation mode, a menu option for a utility sub-menu, a menu option for changing the time alarm value, and a menu option to skip the next alarm, i.e. the time alarm function skips the next scheduled periodic alarm indication only and without disabling forthcoming alarm indications.

Although this first selectable menu list 31 is robust in functions, the user may experience confusion if presented with such a default menu GUI if the user awakens early and before the alarm indication, i.e. the user is in a groggy state and may be less apt to readily use a complex time alarm function GUI. Indeed, in typical time alarm functions, this arrangement may lead to erroneous inputs by the user, such as disabling the alarm unintentionally.

The processor 24 illustratively generates a second time alarm function GUI 40 including a second selectable menu list 41 on the display different from the first selectable menu list 31 when a current time is within a threshold time of the time alarm value (Blocks 65, 69). For example, the threshold time may comprise 15 minutes, and the processor 24 may be configured to permit the setting of the threshold time via the input device 23. The second time alarm function GUI 40 also includes a time display 42 including the current time value, and the time alarm value.

More specifically, the processor 24 illustratively includes generates the second selectable menu list 41 comprising a menu option for skipping a next alarm indication, and a menu option for engaging the snooze function. Advantageously, if the user awakens before an alarm indication and wishes to disable the next alarm indication, the user is presented with a sharp and efficient GUI rather than the onerous and cumbersome GUI of typical alarm function programs (Block 71). Indeed, in certain advantageous embodiments, the second selectable menu list 41 may comprise only one single menu option, thereby reducing the chances for user error.

Example components of a mobile wireless communications device 1000 that may be used in accordance with the above-described embodiments are further described below with reference to FIG. 5. The device 1000 illustratively includes a housing 1200, a keyboard or keypad 1400 and an output device 1600. The output device shown is a display 1600, which may comprise a full graphic liquid crystal display (LCD). Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 5:
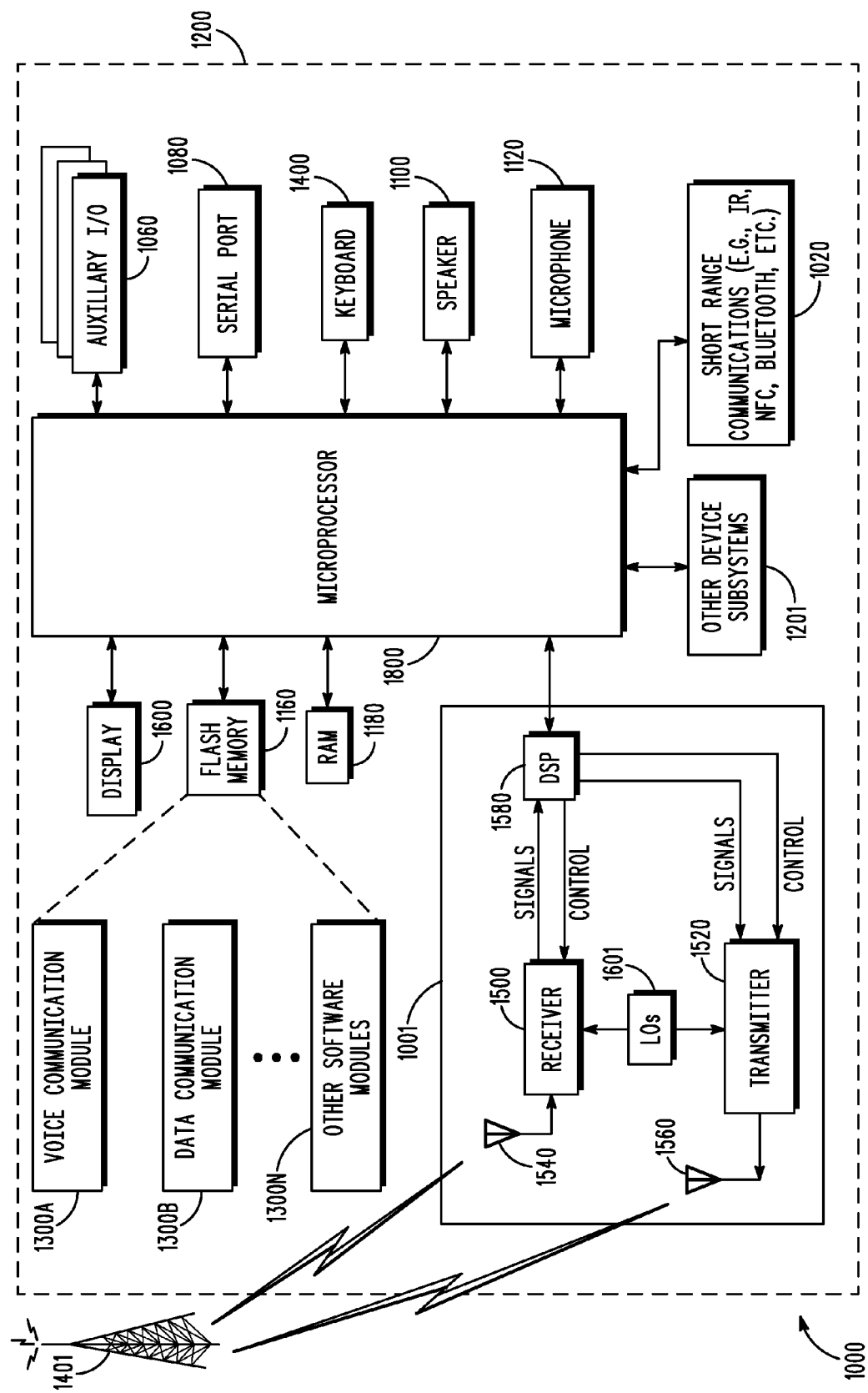
FIG. 5 is a schematic block diagram illustrating example components of a mobile wireless communications device that may be used with the mobile wireless communications device of FIG. 1.

In addition to the processing device 1800, other parts of the mobile device 1000 are shown schematically in FIG. 5. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem 1020. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TACT or General Packet Radio Service (GPRS) mobile data communications networks, and also designed to operate with any of a variety of voice communications networks, such as Advanced Mobile Phone System (AMPS), time division multiple access (TDMA), code division multiple access (CDMA), Wideband code division multiple access (W-CDMA), personal communications service (PCS), GSM (Global System for Mobile Communications), enhanced data rates for GSM evolution (EDGE), etc. Other types of data and voice networks, both separate and integrated, may also be utilized with the mobile device 1000. The mobile device 1000 may also be compliant with other communications standards such as 3GSM, 3rd Generation Partnership Project (3GPP), Universal Mobile Telecommunications System (UMTS), 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a NFC sensor for communicating with a NFC device or NFC tag via NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A mobile wireless communications device comprising:
a portable housing;
a wireless transceiver carried by said portable housing;
an input device carried by said portable housing;
a display carried by said portable housing; and
a processor carried by said portable housing and coupled to said wireless transceiver, said input device, and said display, said processor configured to
perform a time alarm function having a time alarm value settable via said input device,
generate an alarm indication upon reaching the time alarm value,
generate a first time alarm function graphical user interface (GUI) on said display including a first selectable menu list for the time alarm function, and
generate a second time alarm function GUI including a second selectable menu list on said display different from the first selectable menu list when a current time is within a threshold time of the time alarm value.

2. The mobile wireless communications device of claim 1 wherein said processor is configured to generate the second selectable menu list comprising a menu option for skipping a next alarm indication.

3. The mobile wireless communications device of claim 1 wherein said processor is configured to generate the first selectable menu list comprising a menu option for changing the time alarm value.

4. The mobile wireless communications device of claim 1 wherein said processor is configured to generate the first selectable menu list comprising a menu option for disabling the time alarm function.

5. The mobile wireless communications device of claim 1 wherein said processor is configured to generate the first selectable menu list comprising a menu option for changing an alarm operation mode.

6. The mobile wireless communications device of claim 1 wherein said processor is configured to generate the first selectable menu list comprising a menu option for a utility sub-menu.

7. The mobile wireless communications device of claim 1 further comprising a speaker carried by said housing and coupled to said processor; and wherein said processor is configured to generate the alarm indication on said speaker.

8. The mobile wireless communications device of claim 1 wherein said processor is configured to permit the setting of the threshold time via said input device.

9. The mobile wireless communications device of claim 1 wherein said input device comprises a touch portion of said display.

10. A mobile wireless communications device comprising:
a portable housing;

a wireless transceiver carried by said portable housing;

an input device carried by said portable housing;

a display carried by said portable housing;

a speaker carried by said housing; and a processor carried by said portable housing and coupled to said wireless transceiver, said input device, said display, and said speaker, said processor configured to perform a time alarm function having a time alarm value settable via said input device, generate an alarm indication on said speaker upon reaching the time alarm value, generate a first time alarm function graphical user interface (GUI) on said display including a first selectable menu list for the time alarm function, and generate a second time alarm function GUI including a second selectable menu list on said display different from the first selectable menu list when a current time is within a threshold time of the time alarm value, the second selectable menu list comprising a menu option for skipping a next alarm indication.

11. The mobile wireless communications device of claim 10 wherein said processor is configured to generate the first selectable menu list comprising a menu option for changing the time alarm value.

12. The mobile wireless communications device of claim 10 wherein said processor is configured to generate the first selectable menu list comprising a menu option for disabling the time alarm function.

13. The mobile wireless communications device of claim 10 wherein said processor is configured to generate the first selectable menu list comprising a menu option for changing an alarm operation mode.

14. The mobile wireless communications device of claim 10 wherein said processor is configured to generate the first selectable menu list comprising a menu option for a utility sub-menu.

15. The mobile wireless communications device of claim 10 wherein said processor is configured to permit the setting of the threshold time via said input device.

16. A method of operating a time alarm function with a settable time alarm value for a mobile wireless communications device, the method comprising:

generating a first time alarm function graphical user interface (GUI) on a display of the mobile wireless communications device and including a first selectable menu list for the time alarm function if a current time is outside a threshold time of the time alarm value; and generating a second time alarm function GUI including a second selectable menu list on the display different from the first selectable menu list when the current time is within the threshold time of the time alarm value.

17. The method of claim 16 further comprising generating the second selectable menu list to comprise a menu option for skipping a next alarm indication.

18. The method of claim 16 further comprising generating the first selectable menu list to comprise a menu option for changing the time alarm value.

19. The method of claim 16 further comprising generating the first selectable menu list to comprise a menu option for disabling the time alarm function.

20. The method of claim 16 further comprising generating the first selectable menu list to comprise a menu option for changing an alarm operation mode.

21. The method of claim 16 further comprising generating the first selectable menu list to comprise a menu option for a utility sub-menu.

* * * * *